(12) United States Patent
Pal et al.

(10) Patent No.: US 9,972,176 B2
(45) Date of Patent: May 15, 2018

(54) METHODS AND SYSTEMS FOR PLANNING EVACUATION PATHS

(71) Applicant: Tata Consultancy Services Limited, Mumbai (IN)

(72) Inventors: Arindam Pal, Kolkata (IN); Gopinath Mishra, Kolkata (IN); Subhra Mazumdar, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days. days.

(21) Appl. No.: 15/214,105

(22) Filed: Jul. 19, 2016

(65) Prior Publication Data

US 2017/0053503 A1 Feb. 23, 2017

(30) Foreign Application Priority Data

Aug. 20, 2015 (IN) .......................... 3186/MUM/2015

(51) Int. Cl.
*G08B 23/00* (2006.01)
*G08B 7/06* (2006.01)
(Continued)

(52) U.S. Cl.
CPC ........... *G08B 7/066* (2013.01); *G06Q 10/047* (2013.01); *G06Q 90/205* (2013.01)

(58) Field of Classification Search
CPC . G08B 7/00; G08B 7/06; G08B 7/066; G08B 3/00; G08B 6/00; G06Q 10/047; G06Q 90/205
(Continued)

(56) References Cited

U.S. PATENT DOCUMENTS 8,249,810 B2 8/2012 Jones
2007/0192064 A1* 8/2007 Nakamura ............. G06Q 10/06
702/185
(Continued)

FOREIGN PATENT DOCUMENTS

CN 101695953 11/2010
CN 102521998 6/2012
(Continued)

OTHER PUBLICATIONS

Hamacher, H.W. et al. (2002). "Mathematical Modelling of Evacuation Problems: A State of Art," *In Pedestrian and Evacuation Dynamics*: pp. 1-36.
(Continued)

*Primary Examiner* — George Bugg
*Assistant Examiner* — Anthony D Afrifa-Kyei
(74) *Attorney, Agent, or Firm* — Finnegan, Henderson, Farabow, Garrett & Dunner LLP

(57) ABSTRACT

Methods and systems for planning evacuation paths are provided to identify an optimum path for evacuation of every evacuee from a region of interest. Methods of the instant disclosure ensure that for each suggested evacuation path, the capacity of any edge on the path is not exceeded and the evacuation time is minimum. A path once identified is maintained. A randomized behavior model is employed to re-distribute evacuees in emergency situations. This provides optimum evacuation time that employs an improved technique with optimized run time and evacuation time after taking into consideration herd behavior.

17 Claims, 6 Drawing Sheets

(51) Int. Cl.
*G06Q 90/00* (2006.01)
*G06Q 10/04* (2012.01)
(58) Field of Classification Search
USPC .......................................... 340/501
See application file for complete search history.

(56) References Cited

U.S. PATENT DOCUMENTS

2012/0047083 A1* 2/2012 Qiao .................... A62C 99/009
705/325
2016/0314554 A1* 10/2016 Pillac ................. G01C 21/3407

FOREIGN PATENT DOCUMENTS

| | | |
|---|---|---|
| CN | 102646166 | 8/2012 |
| CN | 102693330 | 9/2012 |
| CN | 103327082 | 9/2013 |
| CN | 103776452 | 5/2014 |
| CN | 104008417 | 8/2014 |
| CN | 104239636 | 12/2014 |
| TW | I235928 | 7/2005 |

OTHER PUBLICATIONS

Okada, M. et al. "Optimization of Personal Distribution for Evacuation Guidance based on Vector Field," *IEEE/RSJ International Conference on Intelligent Robots and Systems*, Sep. 25-30, 2011, San Francisco, CA: pp. 3673-3678.

* cited by examiner

METHODS AND SYSTEMS FOR PLANNING EVACUATION PATHS

PRIORITY CLAIM

This U.S. patent application claims priority under 35 U.S.C. § 119 to: India Application No. 3186/MUM/2015 filed on 20 Aug. 2015. The entire contents of the aforementioned application are incorporated herein by reference.

TECHNICAL FIELD

The embodiments herein generally relate to planning evacuation paths, and more particularly to systems and methods involving probabilistic behavior models.

BACKGROUND

Evacuation planning is a critical aspect that involves movement of people away from threat or actual occurrence of hazard such as natural disasters, terrorist attacks, fires and bombs. Safe evacuation of a large number of people in a timely manner is a major challenge for building administrators.

There have been several endeavors in this domain to provide methods for planning evacuation paths. Linear Programming (LP) based polynomial time techniques for evacuation problem uses time-expanded graphs for the network, where the expression for time complexity makes it non-scalable even for mid-sized networks. Capacity Constrained Route Planner (CCRP) techniques use generalized shortest path technique to find shortest paths from any source to any sink, provided that there is enough capacity available on all nodes and edges of the path. Space complexity and unnecessary expansion of source nodes in each iteration are two main disadvantages of CCRP. CCRP++ runs faster than CCRP but the quality of solution is not good, because availability along a path may change between the times when paths are reserved and when they are actually used.

Network flow based approaches are based on minimum cost transshipment and earliest arrival transshipment. The minimum cost approach does not consider the distances between evacuees and exits. It may fail if there are exits very far away. Problems also arise if a lot of exits share the same bottleneck edges. The earliest arrival approach uses an optimal flow over time and thus does not suffer from these problems. But the exit assignment computed by the earliest arrival approach may not be optimal.

There is a need therefore for methods and systems that address the above and other possible drawbacks and limitations of the currently used methods and systems for planning evacuation paths.

SUMMARY

Embodiments of the present disclosure present technological improvements as solutions to one or more of the above-mentioned technical problems recognized by the inventors in conventional systems.

Systems of the present disclosure identify shortest paths from at least one source to a sink in increasing order of transit time in each iteration till the transit time of the currently identified path exceeds the combined evacuation time CET of the previously added set of paths. Also, systems of the present disclosure are not required to identify all possible paths from a source to a sink; if a path is added in any iteration, it remains till the end. The combined evacuation time CET after each iteration will be monotonically non-increasing.

In an emergency, people tend to panic and do not always follow suggested paths. To address this issue, system of the present disclosure includes a simple randomized behavior model to obtain a minimum expected evacuation time.

Methods and systems are described that enable planning of evacuation paths, in a region of interest, from source nodes to sink nodes in a network of routes including a plurality of nodes (n), vertices and edges (E) therebetween.

In an aspect, a computer implemented method of the present disclosure includes receiving input parameters comprising layouts of the region of interest, number of evacuees (p), transit time (T) and maximum capacity (C) associated with each edge (E); defining the network of routes based on the received input parameters; iteratively performing the steps of identifying shortest paths (P) from each source to a sink in increasing order of transit time associated with the routes constituting the network of routes, eliminating at least one of a node or an edge associated with each identified path to obtain a residual network of routes, and computing combined evacuation time (CET) and reserve capacity at each of the nodes and edges in the residual network of routes, until at least one termination condition is satisfied; and computing number of evacuees to be distributed along a each of the identified paths.

In an embodiment, the method described herein above further includes re-distributing evacuees according to a probabilistic behavioral model.

In an embodiment, the step of computing number of evacuees satisfies the relationship $$T_i + \frac{x_i}{C_i} - 1 = CET,$$

wherein $x_i$ is the number of evacuees along path $P_i$ having $T_i$ transit time and maximum capacity $C_i$.

In an embodiment, the step of re-distributing evacuees further includes a step of computing expected evacuation time according to the relationship:

$$E[T] = \max\left(T_1 + \frac{(1-\alpha)n}{C_1} - 1, \max_{2 \le i \le k}\left(T_i + \frac{\alpha x_i}{C_i} - 1\right)\right)$$

wherein, E[T] is expected evacuation time, $T_i$ is transit time along Path $P_i$, $(1-\alpha)$ is the probability that an evacuee follows the shortest path to the nearest sink, $\alpha$ is the probability that an evacuee follows suggested path, $x_i$ is the number of evacuees along path $P_i$ and k is the number of identified paths.

In another aspect, there is provided a system for planning evacuation paths, in a region of interest, from source nodes to sink nodes in a network of routes comprising a plurality of nodes (n), vertices and edges (E) therebetween, the system comprising one or more processors; a communication interface device; one or more internal data storage devices operatively coupled to the one or more processors for storing: an input module configured to receive input parameters comprising layouts of the region of interest, number of evacuees (p), transit time (T) and maximum capacity (C) associated with each edge (E); a network module configured to define the network of routes based on the received input parameters; a path identifier module configured to identify shortest paths (P) from each source to a sink in increasing order of transit time associated with the routes; eliminate at least one of a node or an edge associated with each identified path to obtain a residual network of routes and further configured to compute combined evacuation time (CET) and reserve capacity at each of the nodes and edges in the residual network of routes; and an evacuee distributing module configured to compute number of evacuees to be distributed along each of the identified paths.

In an embodiment, the system as described herein above can further comprise a path optimizer module configured to re-distribute evacuees according to a probabilistic behavioral model.

In yet another aspect, there is provided a computer program product for processing data, comprising a non-transitory computer readable medium having program instructions embodied therein for: receiving input parameters comprising layouts of the region of interest, number of evacuees (p), transit time (T) and maximum capacity (C) associated with each edge (E); defining the network of routes based on the received input parameters; iteratively performing the steps of discovering shortest paths (P) from each source to a sink in increasing order of transit time associated with the routes, eliminating at least one of a node or an edge associated with each discovered path to obtain a residual network of routes, and computing combined evacuation time (CET) and reserve capacity at each of the nodes and edges in the residual network of routes, until at least one termination condition is satisfied; computing number of evacuees to be suggested to follow a particular discovered path; and re-distributing evacuees according to a probabilistic behavioral model.

It is to be understood that both the foregoing general description and the following detailed description are exemplary and explanatory only and are not restrictive of the invention, as claimed.

BRIEF DESCRIPTION OF THE DRAWINGS

The embodiments herein will be better understood from the following detailed description with reference to the drawings, in which.

DETAILED DESCRIPTION

Figure 1:
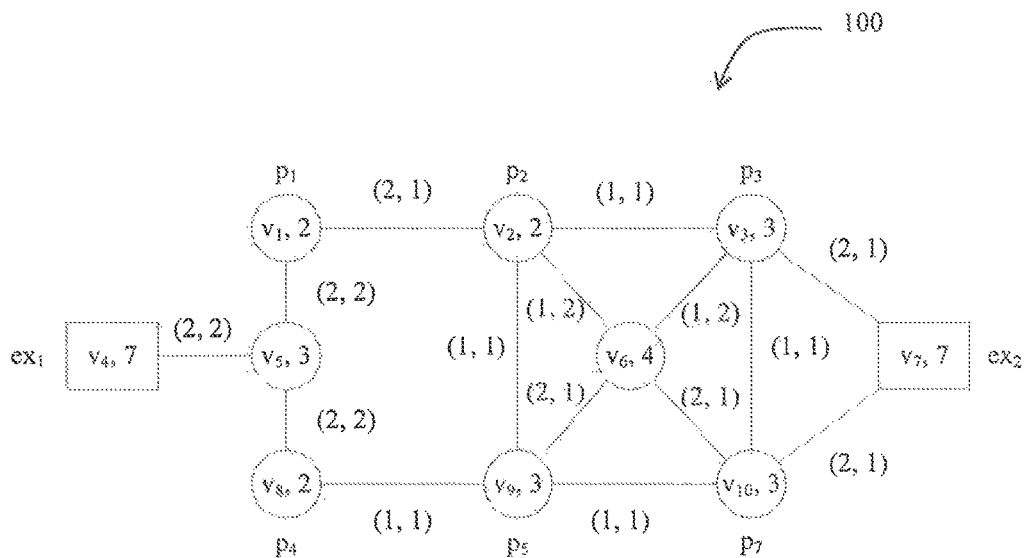
FIG. 1 illustrates an exemplary building graph defined on the basis of input parameters received by a system of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

For ease of explanation, the description of systems and methods of the present disclosure is provided with reference to a non-limiting example of Single source Single sink Evacuation Problem (SSEP) like evacuating people in an emergency as soon as possible from an auditorium having only one exit in the building. It may be understood that systems and methods of the present disclosure can find applicability in Multiple Source Multiple Sink scenarios with suitable adaptations.

Referring now to the drawings, and more particularly to FIGS. 1 through 6, where similar reference characters denote corresponding features consistently throughout the figures, there are shown preferred embodiments and these embodiments are described in the context of the following exemplary system and method.

FIG. 1 illustrates exemplary building graph 100 defined on the basis of input parameters received by a system of the present disclosure. The building floor plan can be represented as a graph $G=(V, E)$, where V and E are the set of vertices and edges respectively. The number of vertices and edges are n and m respectively. Nodes represent rooms, lobbies and intersection points and arcs represent corridors, hallways, staircases and the like. Some nodes in the building having significant number of people are modeled as source nodes. The exits of a building are represented as sink nodes. Each node has a capacity, which is the maximum number of people that can stay at that location at any given time and an occupancy, which is the number of people currently occupying the location. p is the total number of people who needs to be evacuated or the evacuees.

Each edge has a capacity, which is the maximum number of people that can traverse the edge per unit time and a travel time, which is the time needed to travel from one node to another node along that edge.

The expression "region of interest" as referred to in the present disclosure pertains to region or premise of threat or actual occurrence of hazards such as natural disasters, terrorist attacks, fires and bombs.

The expression "evacuee" as referred to in the present disclosure pertains to people who are intended to be evacuated from the "region of interest" as described herein above and may be used interchangeably with the expression "evacuee" in the context of the present disclosure.

The expression "position detection device" as referred to in the present disclosure refers to at least one of sensors, wearable devices, mobile devices including smartphones, hand-held devices, portable devices and PDAs that can enable detection of location information pertaining to an evacuee. Sensors referred to in this context may be heat sensors, motion sensors or location sensors based on Wi-Fi or any other means known in the art. Accordingly, in the context of the present disclosure, the expressions "position detection device" and "sensors" may be used interchangeably to refer to device that provides location information either directly or indirectly.

Again, expressions used interchangeably throughout the description include {graph, network}, {node, vertex}, {edge, arc}, and {path, route}.

The expression "transit time" as referred to in the present disclosure pertains to the sum of the transit times of all the edges in path P from source s to sink t, and is denoted as T(P).

The expression "destination arrival time of a path" as referred to in the present disclosure is the time required by a person to move from source s to sink t using path P subject to prior reservations, and is denoted as DA(P). In other words, DA(P) is the sum of T(P) and any intermediate delay and DA(P)≥T(P).

The expression "capacity of a path" as referred to in the present disclosure pertains to the minimum of the capacities of all nodes and edges present in path P, and is denoted by C(P).

The expression "saturated node or edge" as referred to in the present disclosure pertains to a node or edge on a path P when capacity of that node or edge is the same as the capacity of path P.

The expression "distinct paths" as referred to in the present disclosure pertains to two paths $P_1$ and $P_2$ if and only if $V_1 \neq V_2$ or $E_1 \neq E_2$, where $V_1$, $V_2$ are the set of vertices and $E_1$, $E_2$ are the set of edges in the paths $P_1$ and $P_2$ respectively.

Exemplary building graph 100 consists of 10 vertices and 15 edges. For each vertex v, its name and the capacity are specified by a pair of the form (v, c(v)). A vertex representing an exit is represented as a square, while the others are represented as circles. For each edge e, the capacity and the travel time are specified on the edge by the pair (c(e), d(e)). The goal of the system of the present disclosure is to find the exit and an optimal path (route) for each evacuee, subject to the constraint that the number of source-sink paths passing through an edge does not exceed the capacity of the edge at any unit time interval. The objective function that the system of the present disclosure minimizes is the total time of evacuation. This is the time at which the last evacuee is evacuated, hereinafter referred to as the evacuation time. In an embodiment, system of the present disclosure can minimize time T in which a feasible flow value at least f can be sent from sources to sinks.

Figure 2:
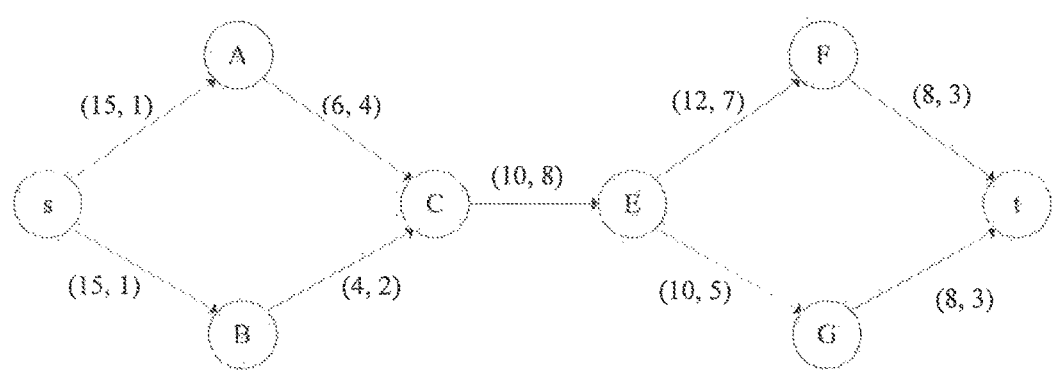
FIG. 2 illustrates a portion of an exemplary graph showing parallel flows sent on non edge-disjoint paths.

FIG. 2 illustrates a portion 200 of an exemplary graph showing parallel flows sent on non edge-disjoint paths. In FIG. 2, ordered pair (C, T) denotes capacity and transit time of an edge. There are two paths $P_1$ and $P_2$ between source s and sink t.

$P_1: s-B-C-E-G-t, C(P_1)=4, T(P_1)=19$.

$P_2: s-A-C-E-F-t, C(P_2)=6, T(P_2)=23$.

Paths $P_1$ and $P_2$ are not edge-disjoint, but common edge CE has capacity of 10. Accordingly, $C(P_1)+C(P_2)=C(CE)$. So, flow can be sent through paths $P_1$ and $P_2$ in parallel and edge CE can be considered for all practical purposes as being two edges one having capacity 4 dedicated for $P_1$ and other one having capacity 6, dedicated for $P_2$.

The concepts of combined evacuation time (CET) and quickest paths, as known in the art, consider both transit time and capacity on each path and provide a fair balance between them. In the event that there are k edge-disjoint paths P1, P2, . . . , Pk from source node s to sink node t, the combined evacuation time is given by, $$CET(P_1, \ldots, P_k) = \left\lceil \frac{p + \sum_{i=1}^{k} C_i T_i}{\sum_{i=1}^{k} C_i} \right\rceil \quad (1)$$

wherein, $C_i$ and $T_i$ denote the capacity and transit time of path $P_i$ respectively, and p denotes the number of evacuees. Time required to evacuate p people via a path P having transit time T and capacity C is $$T + \left\lceil \frac{p}{C} \right\rceil - 1.$$

So, $P_i$ is said to be the quickest path in the event that, $$T_i + \left\lceil \frac{p}{C_i} \right\rceil - 1 \leq T_j + \left\lceil \frac{p}{C_j} \right\rceil - 1, \forall j \in \{1, \ldots, k\} \setminus \{i\}$$

The formula for CET, as known in the art, provides an expression for evacuation time and the number of people that will be evacuated on each path. It will be understood by those skilled in the art that paths having lesser arrival time will evacuate more groups. This technique is known as QPER (Quickest Path Evacuation Routing). The technique finds all edge-disjoint paths between a single source and a single sink and orders them according to the quickest evacuation time (calculated using CET) and adds them one by one. The technique does not use time-expanded graphs and there is no need to store availability information at each time stamp, as only edge-disjoint paths are considered. But the technique is limited to Single source Single sink Evacuation Problems (SSEP). Also, the addition of paths is not consistent, i.e., a path added at some point of time may be removed by the technique at a latter point of time, in case removal makes the solution better.

In accordance with the present disclosure, to apply the formula of combined evacuation time CET for a set of paths, it is not necessary that the paths are edge-disjoint, instead the condition is that paths can be used to send flow in parallel as illustrated in FIG. 2. Conventionally, in an optimal solution of Single Source Sink Evacuation Problem (SSEP), all possible paths between source s and sink t may be used up. In the event that $P_1, P_2, \ldots, P_K$ are k paths from source s to sink t (not necessarily edge-disjoint), in the worst case k can be exponentially large. But in accordance with the present disclosure, all k paths are not identified at the beginning. Instead paths are identified one by one in the order of their transit time. Firstly, path $P_1$ along with its capacity $C_1$ having minimum transit time is identified and capacities of each node and path of $P_1$ is decreased by its capacity $C_1$ permanently to obtain a residual graph. Then path P2 having minimum transit time in the residual graph is identified and so on. After each path addition combined evacuation time CET can be calculated. In an embodiment, a formal technique for the method of the present disclosure can be as described in Technique 1 herein below.

---

Input: A graph G (V, E) representing the network with designated source s ϵV and sink t ϵV. Every node v ϵV has an occupancy and maximum capacity. Every edge e ϵE has a maximum capacity and transit time.
Initially, all persons are in s.
Output: Evacuation route plan for each person.
begin
    Initialize R = ø and CET = ∞.
    Initialize i ← 0.
    while (t is reachable from s) and number of discovered paths ≤ p − 1 ≤
    do
Find the shortest path $P_{i+1}$ from s to t in G (V, E) and let $T_{i+1}$, $C_{i+1}$ be its transit time and capacity respectively.

-continued

```
If T_{i+1} ≤ CET then
    R = ∪{P_{i+1}}.
    CET = CET (S_{i+1}).
    Reduce capacity of each node and each edge of P_{i+1} by C_{i+1}
    V = V\ {v: v is a saturated node of P_{i+1}}.
    E = E\ {e: e is a saturated edge of P_{i+1}}.
end
else
    break.
end
end
Let R = {P_1, P_2, ..., P_k}
Send x_i persons via P_i, 1 ≤ i ≤ k, where
```

$$T_i + \frac{x_i}{c_i} - 1 = CET.$$

end

Running time analysis of SSEP in accordance with the present disclosure—In the event that paths $P_1, P_2 \ldots P_K$ are identified after execution of Technique 1, as in each step at least one edge or one node is deleted, at most m+n paths will be identified by system of the present disclosure. In each path at least one person will be evacuated. In the worst case, system of the present disclosure can identify p paths. Hence, k≤min(m+n, p). As each path identification can be done in O(m+n log n) time, Technique 1 requires O(min(m+n,p) (m+n log n)) time. Assuming m=O(n), this becomes O(min (n, p)·n log n), which is always at most O(pn log n). Time-complexity of CCRP as known in the art is O(pn log n). Hence, SSEP in accordance with the present disclosure always performs faster than CCRP. In real life, the number of evacuees is much larger than the number of vertices, so SSEP runs much faster than CCRP.

Analysis of Technique 1—Let $(P_1, C_1), (P_2, C_2), \ldots, (P_k, C_k)$ be distinct paths (not necessarily edge-disjoint) from s to t in order of their transit time identified by CCRP.
1. Number of iterations that will return path $P_i$ is $T_k-T_i+\varepsilon$, 1≤i≤k, where ε denotes number of iterations that returns path $P_k$.
2. Number of Iterations that will return path $P_i$ before phase j is $T_j-T_i$, where i≤j≤k.
3. The same paths will be returned by Technique 1.

In accordance with the present disclosure, addition of paths by Technique 1 of the present disclosure is consistent, i.e. when a path is added then it will remain till the end of the technique execution. Again, the evacuation time of the solution given by Technique 1 is at most as that of the CCRP technique for single source and single sink.

In accordance with the present disclosure, upper bound on the evacuation time given by CCRP (hence by Technique 1) for single source single sink network is $$\left\lfloor \frac{p}{k} \right\rfloor + (n-1)\tau - 1,$$

where p is the number of evacuees, n is the number of nodes in the graph, τ is the maximum transit time of any edge and k is the number of paths used by CCRP (and Technique 1). Technique 1 also finds a path after saturated nodes and edges of all previously identified path are deleted if it satisfies the conditions given in Technique 1 (line numbers 4 and 6). Each path identified by CCRP can be represented as an ordered pair of path and its group size. Technique 1 also returns a path with maximum number of evacuees who can travel by that path at a time. As each path is identified only once in Technique 1, we can also represent each path along with the capacity as an ordered pair. The above upper bound is tight. For instance, for a line graph of 10 nodes where first node is the source and last node is the sink, if each node and edge has capacity of 1 and each edge has a transit time of 10 and in the event there is only one evacuee, the evacuation time is 90 for p=1, k=1, n=10, τ=10.

In accordance with an embodiment, Technique 1 described herein above can be extended to the case where there is a single source and multiple sinks. A super sink can be created which is connected to all the sinks of the original graph. The capacity and transit time of all the edges (that connect the super sink to all original sinks) are ∞ and 0 respectively.

In an emergency situation, people are stressed and they may consider evacuating via the shortest known path as a better option instead of following the route suggested by Technique 1 (or CCRP). This may be due to several factors like route suggested may not be known by a person, they may feel that suggested path will take longer time to evacuate or they may display herd behavior wherein when a path is being followed by majority of people, chances are high that remaining population will also follow the same path. Such factors cause the evacuation pattern to deviate from the optimal solution. In an embodiment, systems and methods of the present disclosure consider probabilistic behavior of people to re-distribute evacuees in an efficient manner.

In the event that in an evacuation, people do not follow paths suggested by Technique 1 (or CCRP), with probability α>0 that a person follows suggested path and with probability 1−α he follows the shortest path (to the nearest exit), system of the present disclosure redistributes people via various paths. If $x_i$ persons are suggested to follow $P_i$, i≠1, then the number of persons of persons who will follow $P_i$ and $P_1$ is $\alpha x_i$ and $(1-\alpha)x_i$ respectively (in expectation). The total number of people following $P_1$ and $P_i$ are $x_1+\Sigma_{i=2}^{k}(1-\alpha)x_i$ and $\alpha x_i$, i≠1 respectively.

Expected time at which the last person will arrive at destination via $P_1$ is $$T_1 + \frac{x_1 + \sum_{i=2}^{k}(1-\alpha)x_i}{C_1}$$

Expected time at which last person will arrive at destination via Pi is $$T_i + \frac{\alpha x_i}{C_i} - 1, i \neq 1.$$

If the expected evacuation time in this scenario be E[T].

$$E[T] = \max\left(T_1 + \frac{(1-\alpha)n}{C_1} - 1, \max_{2 \leq i \leq k}\left(T_i + \frac{\alpha x_i}{C_i} - 1\right)\right)$$

E[T] will be minimum when it satisfies the following equation, $$E[T] = T_1 + \frac{x_1 + \sum_{i=2}^{k}(1-\alpha)x_i}{C_1} - 1 = T_i + \frac{\alpha x_i}{C_i} - 1, \quad (2)$$

-continued $$2 \leq i \leq k,$$

Where $\Sigma_{i=1}^{n} x_i = n$ and $x_i \geq 0$, $\forall i$. Solving the above equation we get, $$E[T] = \frac{n + \sum_{i=1}^{k} C_i T_i}{\sum_{i=1}^{k} C_i} - 1 = CET(\{P_1, P_2, \ldots, P_k\}) \quad (3)$$

Expected evacuation time given by equation (3) doesn't depend on $\alpha$. This is true and solution is feasible as long as $x_1 \geq 0$. But it is not always the case, specifically when $(1-\alpha)\Sigma_{i=2}^{k} x_i > C_1(T-T_1+1)$. So, implicitly evacuation time is dependent on $\alpha$.

In accordance with an embodiment, on expectation $x_1 + \Sigma_{i=2}^{k}(1-\alpha)x_i = \alpha x_1 + (1-\alpha)n$ number of people will be evacuated via path $P_1$. This is minimum when $x_1 = 0$ as $x_1 \geq 0$. So, lower bound for expected evacuation time is $$T1 + \frac{(1-\alpha)n}{C1} - 1.$$

In an embodiment, Technique 1 as described herein above can be succeeded by a formal technique for re-distributing evacuees as described in Technique 2 herein below.

1) Run Technique 1. Find CET and $x_1, x_2, \ldots, x_k$ using Equation (2).
2) If $x_1 \geq 0$ then quit; else go to step 3 of Technique 1. In this case the expected evacuation time=CET.
3) Assign $x_1'$ to 0 and $$x_i' = \frac{nx_i}{\sum_{j=2}^{k} x_j}, \forall i \neq 1.$$

In this case, the expected evacuation time is $$T_1 + \frac{(1-\alpha)n}{C_1} - 1.$$

In accordance with the present disclosure, If $x_i'$ s are calculated then $x_i' < x_i$, $\forall i \neq 1$, and $\Sigma_{i=2}^{n} x_i' = n$.

In accordance with the present disclosure, Technique 2 has an expected evacuation time of $CET(\{P_1, P_2, P_3, \ldots, P_k\})$ when it quits from step-2.

In accordance with the present disclosure, Technique 2 has an expected evacuation time of $$T_1 + \frac{(1-\alpha)n}{C_1} - 1$$

when it quits from step-3.

In accordance with the present disclosure, in SSEP, if evacuees follow the path suggested by Technique 2 with probability $\alpha$, then the expected evacuation time is $$\max\left(CET, T_1 + \frac{(1-\alpha)n}{C_1} - 1\right)$$

and technique runs in $O(\min(n, p) \cdot n \log n)$ time.

Figure 3:
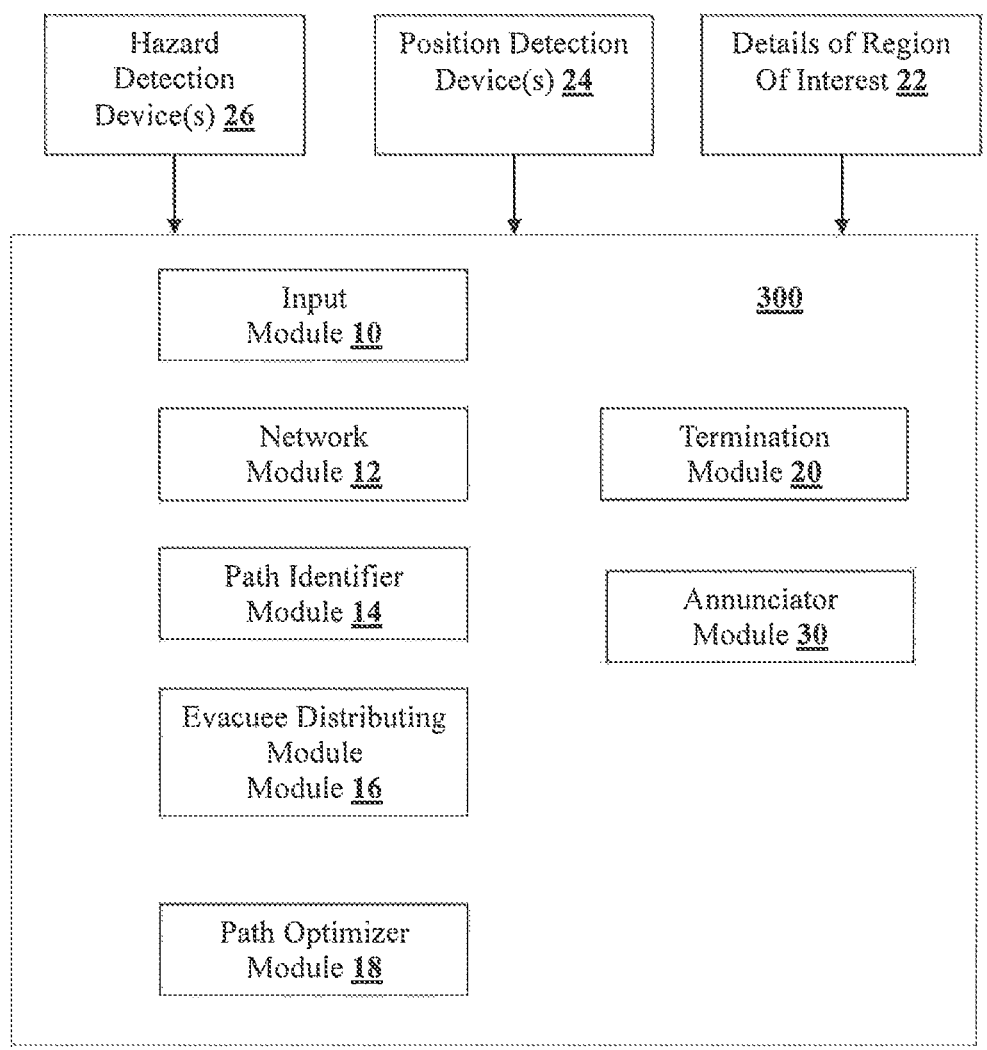
FIG. 3 illustrates an exemplary block diagram of a system for planning evacuation paths in accordance with an embodiment of the present disclosure.
Figure 4A:
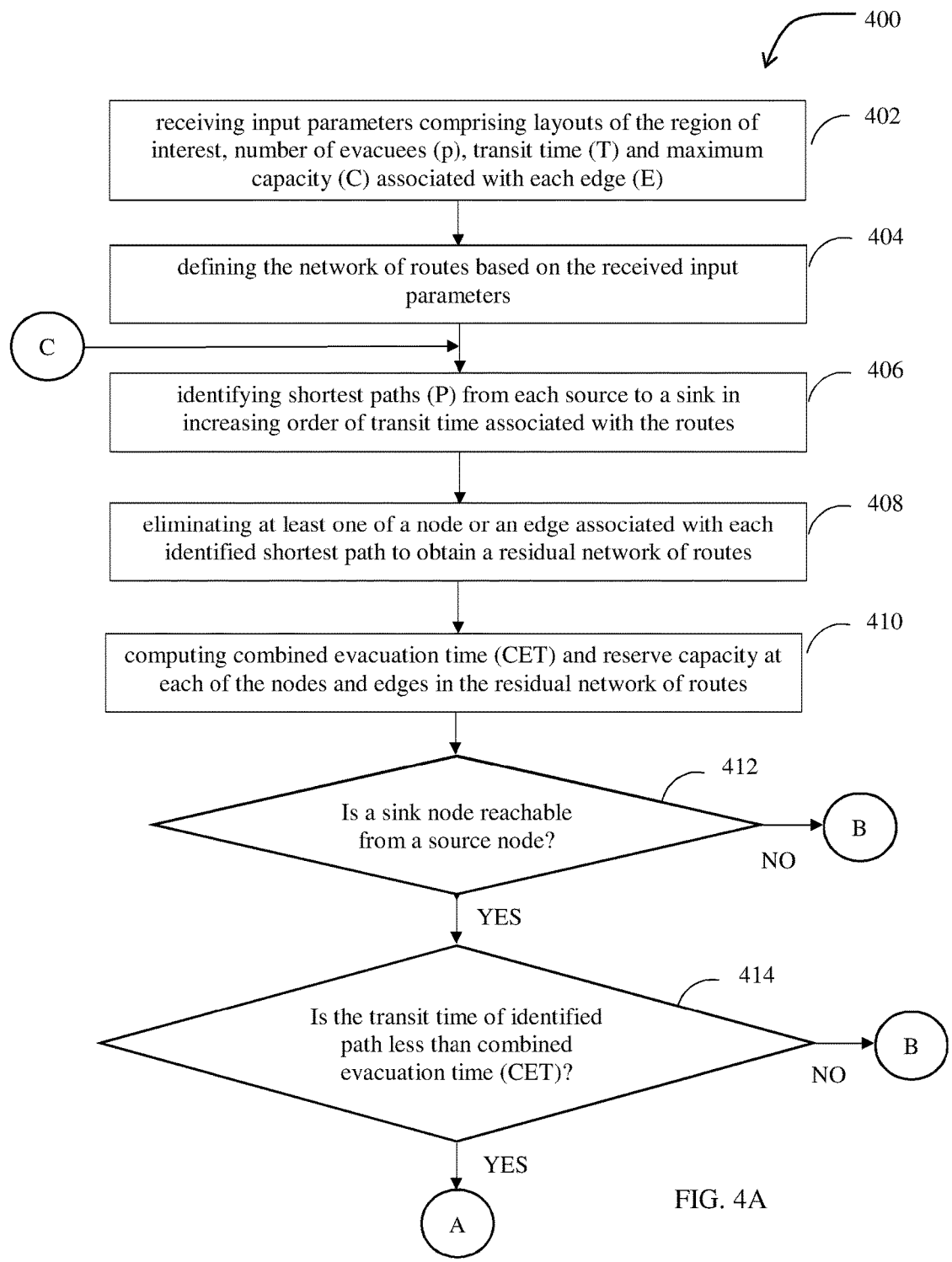
FIG. 4A through FIG. 4B is an exemplary flow diagram illustrating a computer implemented method for planning evacuation paths using the system of FIG. 3 in accordance with an embodiment of the present disclosure.
Figure 4B:
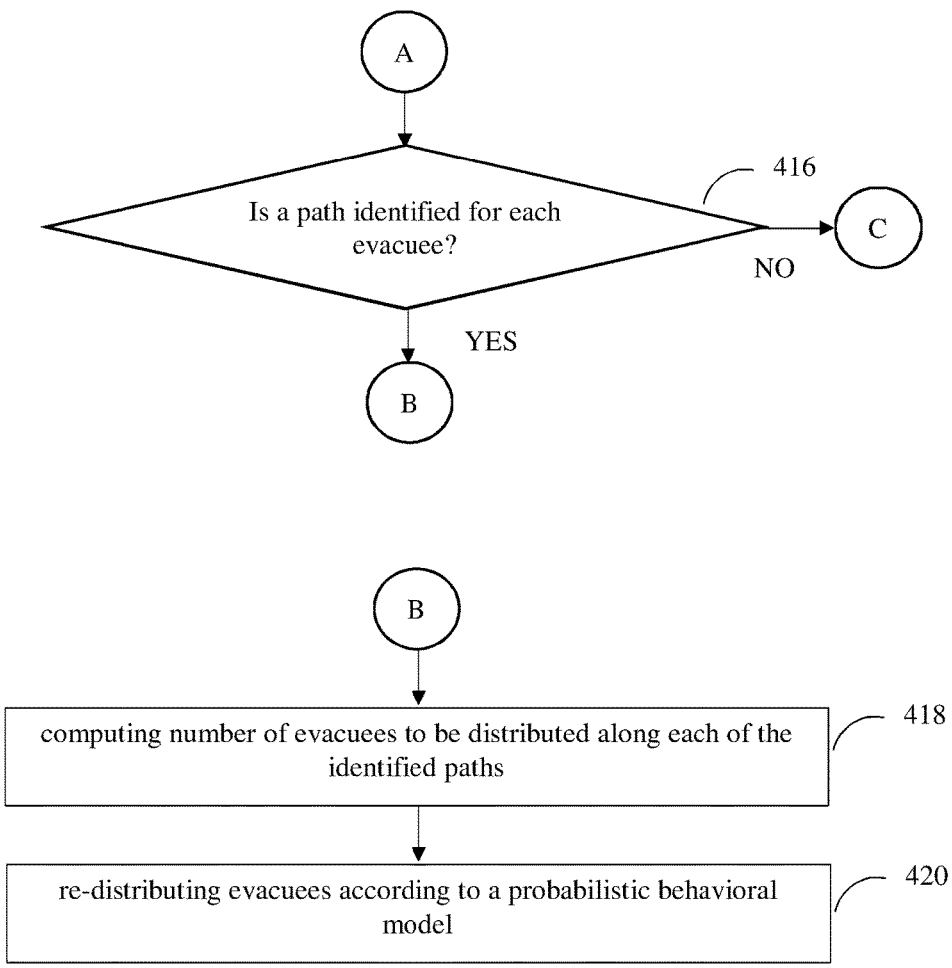

FIG. 3 illustrates an exemplary block diagram of system 300 for planning evacuation paths in accordance with an embodiment of the present disclosure and FIG. 4A through FIG. 4B illustrates an exemplary flow diagram illustrating a computer implemented method 400 for planning evacuation paths using the system of FIG. 3 in accordance with an embodiment of the present disclosure. The steps of method 400 of the present disclosure will now be explained with reference to the components of system 300 as depicted in FIG. 3 for planning evacuation paths, in a region of interest, from source nodes to sink nodes in a network of routes including a plurality of nodes (n), vertices and edges (E) therebetween. In an embodiment, system 300 includes one or more processors (not shown), communication interface or input/output (I/O) interface (not shown), and memory or one or more internal data storage devices (not shown) operatively coupled to the one or more processors. The one or more processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, system 300 can be implemented on a server or in a variety of computing systems, such as a laptop computer, a desktop computer, a notebook, a workstation, a mainframe computer, a server, a network server, cloud, hand-held device and the like.

The I/O interface can include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface can include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the various modules of system 300 can be stored in the memory.

At step 402, input parameters including layouts of the region of interest, number of evacuees (p), transit time (T) and maximum capacity (C) associated with each edge (E) are received at input module 10 of system 100 for planning evacuation paths. In an embodiment, details of the region of interest 22 can include layouts of the region of interest as an input to system 100. In an embodiment, position detection device(s) 24 can provide location Information pertaining to each of the evacuees either directly or indirectly to input module 10. In accordance with an embodiment, system 300 of the present disclosure can be triggered upon receiving an input from one or more hazard detection device(s) 26 to initiate the planning of evacuation paths and computing number of evacuees to be suggested to follow a particular path based on method 400 of the present disclosure.

At step 404, network module 12 can define a network of routes based on the received input parameters. In an embodiment, the received input parameters are defined in the form of a graph as illustrated in exemplary building graph 100 of FIG. 1.

In accordance with an embodiment, path identifier module 14 can be configured to identify shortest paths (P) from each source to a sink in increasing order of transit time associated with the routes at step 406. Further, at step 408, path identifier module 14 can eliminate at least one of a node or an edge associated with each identified shortest path to obtain a residual network of routes. Furthermore, at step 410, path identifier module 14 can compute combined evacuation time (CET) and reserve capacity at each of the nodes and edges in the residual network of routes. In an embodiment, path identifier module 14 is further configured to compute the CET as a function of maximum capacity (C) the transit time (T) and the number of evacuees (p).

In accordance with an embodiment, termination module 20 checks for at least one termination condition to be satisfied for terminating iterative steps 406 through 410. The termination conditions include checking whether there is a sink node reachable from a source node, the transit time of identified path is less than combined evacuation time (CET) and whether there is a path identified for each evacuee.

In accordance with an embodiment, evacuee distributing module 16 can be configured to compute number of evacuees to be suggested to follow a particular identified path at step 418 when termination module 20 does not detect any of the termination conditions. In an embodiment, evacuee distributing module 16 is further configured to compute the number of evacuees such that the relationship $$T_i + \frac{x_i}{C_i} - 1 = CET,$$

is satisfied, wherein $x_i$ is the number of evacuees along path $P_i$ having $T_i$ transit time and maximum capacity $C_i$.

In accordance with an embodiment, path optimizer module 18 can be configured to re-distribute evacuees according to a probabilistic behavioral model at step 420. In an embodiment, path optimizer module 18 can be further configured to compute the expected evacuation time according to the relationship:

$$E[T] = \max\left(T_1 + \frac{(1-\alpha)n}{C_1} - 1, \max_{2 \leq i \leq k}\left(T_i + \frac{\alpha x_i}{C_i} - 1\right)\right)$$

wherein, E[T] is expected evacuation time, $T_i$ is transit time along Path $P_i$, $(1-\alpha)$ is the probability that an evacuee follows the shortest path to the nearest sink, $\alpha$ is the probability that an evacuee follows suggested path, $x_i$ is the number of evacuees along path $P_i$ and k is the number of identified paths. In an embodiment, the step of re-distributing evacuees is preceded by the step of receiving location information pertaining to each of the evacuees.

In an embodiment, system 300 can further include annunciator module 30 that can be configured to provide at least one of audio and video annunciations pertaining to suggested identified path for each evacuee.

EXPERIMENTAL RESULTS

The SSEP and CCRP techniques were executed on a Dell Precision T7600 server having an Intel Xeon E5-2687 W CPU running at 3.1 GHz with 8 cores (16 logical processors) and 128 GB RAM. The operating system was Microsoft Windows 7 Professional 64-bit edition. The C/C++ network analysis libraries igraph and LEMON

| Number of Nodes (n) | Number of Evacuees (p) | SSEP (present disclosure) | | CCRP | | Improvement in SSEP over CCRP (CCRP/SSEP) | |
|---|---|---|---|---|---|---|---|
| | | EVACUATION TIME | RUN TIME | EVACUATION TIME | RUN TIME | EVACUATION TIME | RUN TIME |
| 100 | 3000 | 68 | 0.124 | 69 | 1.326 | 1.01 | 10.69 | were used to implement the techniques and netgen was used to generate synthetic graphs. The number of vertices in the graph varies from 100 to 500,000. The number of people varies from 3,000 to 120,000. The results are shown in Table I.

TABLE I

Comparison between evacuation time and run time between SSEP and CCRP

| 500 | 5000 | 130 | 0.358 | 130 | 2.73 | 1.00 | 7.63 |
|---|---|---|---|---|---|---|---|
| 1000 | 7000 | 155 | 1.014 | 156 | 14.586 | 1.01 | 14.38 |
| 1500 | 9000 | 115 | 1.466 | 117 | 35.443 | 1.02 | 24.18 |
| 2000 | 15000 | 661 | 1.622 | 661 | 29.016 | 1.00 | 17.89 |
| 2500 | 25000 | 179 | 2.761 | 186 | 25.739 | 1.04 | 9.32 |
| 5000 | 40000 | 903 | 3.899 | 903 | 93.521 | 1.00 | 23.99 |
| 10000 | 65000 | 517 | 12.012 | 520 | 231.535 | 1.01 | 19.28 |
| 15000 | 95000 | 1848 | 14.025 | 1853 | 336.946 | 1.00 | 24.02 |
| 25000 | 100000 | 1126 | 23.134 | 1128 | 815.682 | 1.00 | 35.26 |
| 50000 | 120000 | 1436 | 46.69 | 1446 | 1684.217 | 1.01 | 36.07 |
| 100000 | 110000 | 1032 | 93.4952 | 1044 | 3016.3005 | 1.01 | 32.26 |
| 500000 | 100000 | 1698 | 344.341 | 1720 | 11363.253 | 1.01 | 33.00 |

Figure 5:
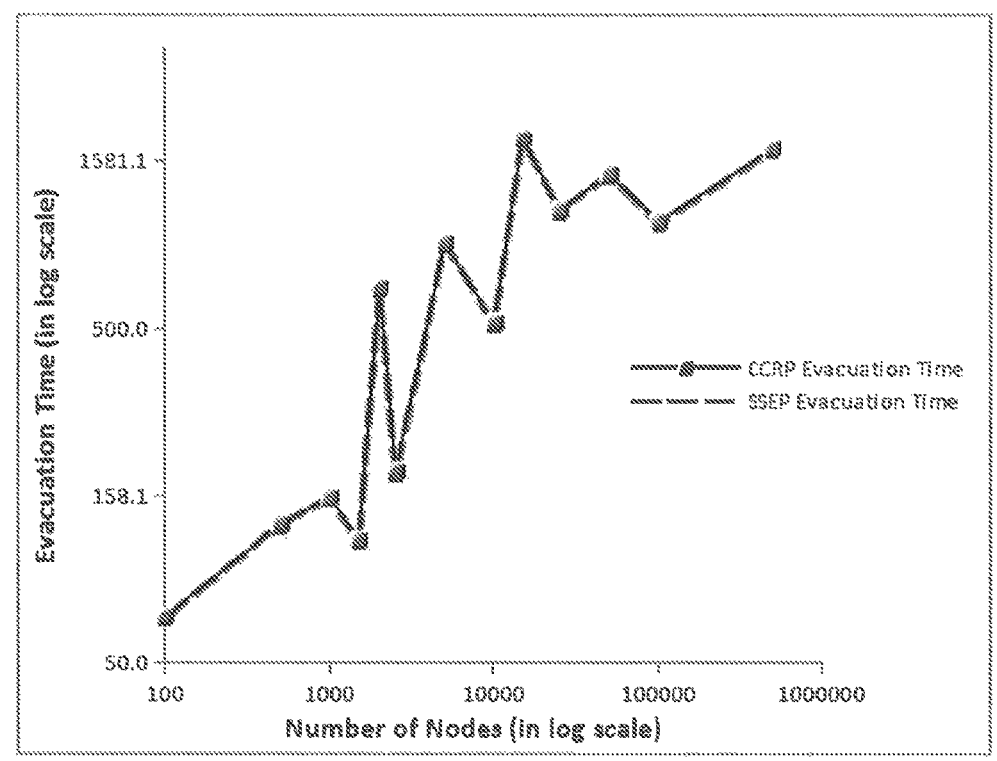
FIG. 5 is a graphical illustration of evacuation time versus number of nodes for Capacity Constrained Route Planner (CCRP) and Single source Single sink Evacuation Problem (SSEP) of the present disclosure.
Figure 6:
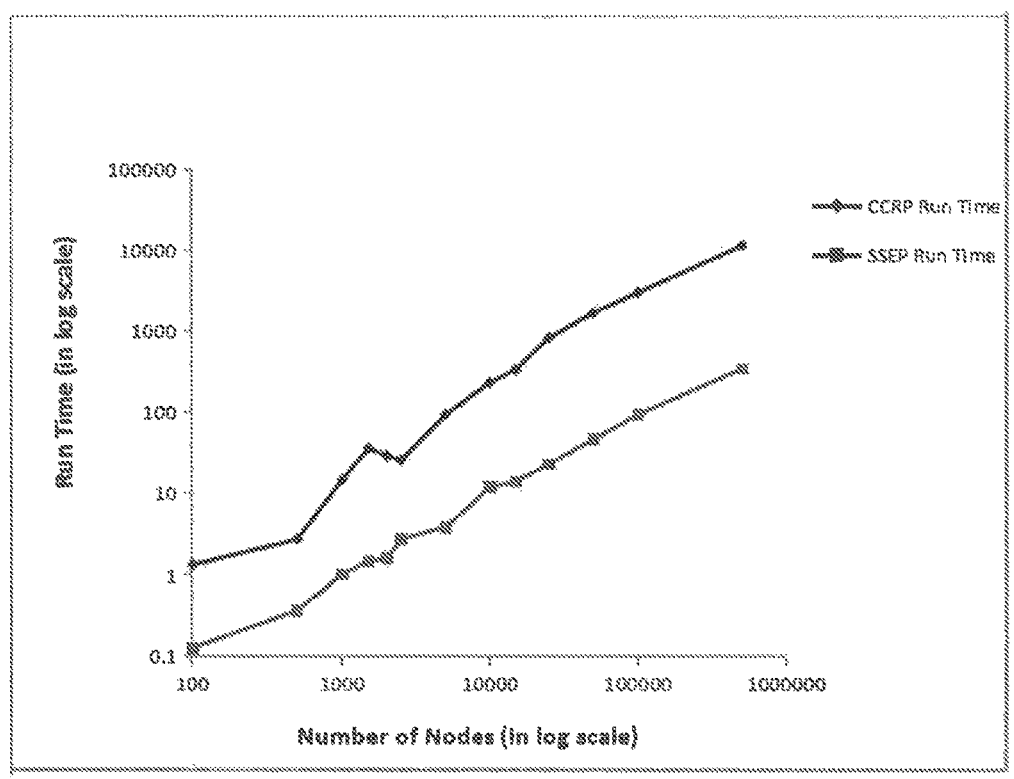
FIG. 6 is a graphical illustration of run time of the technique of the present disclosure versus number of nodes for Capacity Constrained Route Planner (CCRP) and Single source Single sink Evacuation Problem (SSEP) of the present disclosure.

The graphs are plotted on a log-log scale. FIG. 5 is a graphical illustration of evacuation time versus number of nodes for CCRP and SSEP of the present disclosure and FIG. 6 is a graphical illustration of run time of the technique of the present disclosure versus number of nodes for CCRP and SSEP of the present disclosure. From FIG. 5, it can be seen that the evacuation time of SSEP of the present disclosure is at the most that of CCRP. It is evident from FIG. 6 that the running time of SSEP of the present disclosure is much lower than that of CCRP. Hence, for all these instances SSEP clearly outperforms CCRP with respect to both evacuation time and run time. The absolute and relative amount by which SSEP performs better than CCRP is shown in Table I herein above.

Although the description is directed towards evacuation from a premise, the invention can be applied suitably to other applications involving network flow problem including trading, traffic routing, and the like in either a closed or open region.

The written description describes the subject matter herein to enable any person skilled in the art to make and use the embodiments of the invention. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the invention may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as either software and/or hardware modules and may be stored in any type of non-transitory computer readable medium or other storage device. Some non-limiting examples of non-transitory computer-readable media include CDs, DVDs, BLU-RAY, flash memory, and hard disk drives.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A computer implemented method for planning evacuation paths, in a region of interest, from source nodes to sink nodes in a network of routes comprising a plurality of nodes (n), vertices and edges (E) there between, said method comprising:
   (a) receiving input parameters comprising layouts of the region of interest, number of evacuees (p), transit time (T) and maximum capacity (C) associated with each edge (E);
   (b) defining the network of routes based on the received input parameters;
   (c) identifying shortest paths (P) from each source to a sink in increasing order of transit time associated with the routes constituting the network of routes;
   (d) eliminating at least one of a node or an edge associated with each identified shortest path to obtain a residual network of routes;
   (e) computing combined evacuation time (CET) and reserve capacity at each of the nodes and edges in the residual network of routes;
   (f) iteratively performing steps (c) through (e) until at least one condition of
      (i) there is a sink node reachable from a source node;
      (ii) the transit time of identified shortest path is less than combined evacuation time (CET); and
      (iii) there is a path identified for each evacuee; is satisfied; and
   (g) computing number of evacuees to be distributed along each of the identified paths, further wherein computing number of evacuees satisfies a relationship $T_i + x_i C_{i-1} = CET$
   wherein $x_i$ is the number of evacuees along path $P_i$ having $T_i$ transit time and maximum capacity $C_i$.

2. The computer implemented method of claim 1, further comprising re-distributing evacuees according to a probabilistic behavioral model.

3. The computer implemented method of claim 1, wherein the step of defining the network of routes includes defining the received input parameters in the form of a graph.

4. The computer implemented method of claim 1, wherein the CET is a function of maximum capacity (C), the transit time (T) and the number of evacuees (p).

5. The computer implemented method of claim 1, wherein the step of computing number of evacuees satisfies a relationship that is based on the number of evacuees $x_i$ along path $P_i$ having $T_i$ transit time and maximum capacity $C_i$.

6. The computer implemented method of claim 2, wherein the step of re-distributing evacuees further comprises a step of computing expected evacuation time satisfies a relationship based on transit time $T_i$ along Path $P_i$, probability that an evacuee follows the shortest path to the nearest sink $(1-\alpha)$, probability that an evacuee follows suggested path $\alpha$, number of evacuees $x_i$ along path $P_i$ and number of identified paths $k$.

7. The computer implemented method of claim 2, wherein the step of re-distributing evacuees further comprises a step of computing expected evacuation time according to a relationship:

$$E[T]=\max(T1+(1-\alpha)\cdot nC1-1, \max_{2\le i\le k}(Ti+\alpha\cdot xi\ Ci-1))$$

wherein, E[T] is expected evacuation time, $T_i$ is transit time along Path $P_i$, $(1-\alpha)$ is the probability that an evacuee follows the shortest path to the nearest sink, $\alpha$ is the probability that an evacuee follows suggested path, $x_i$ is the number of evacuees along path $P_i$ and $k$ is the number of identified paths.

8. The computer implemented method of claim 2, wherein the step of re-distributing evacuees is preceded by the step of receiving location information pertaining to each of the evacuees.

9. A system for planning evacuation paths, in a region of interest, from source nodes to sink nodes in a network of routes comprising a plurality of nodes (n), vertices and edges (E) there between,
said system comprising:
one or more processors;
a communication interface device;
one or more internal data storage devices operatively coupled to the one or more processors for storing:
an input module (10) configured to receive input parameters comprising layouts of the region of interest, number of evacuees (p), transit time (T) and maximum capacity (C) associated with each edge (E);
a network module (12) configured to define the network of routes based on the received input parameters;
a path identifier module (14) configured to identify shortest paths (P) from each source to a sink in increasing order of transit time associated with the routes; eliminate at least one of a node or an edge associated with each identified shortest path to obtain a residual network of routes and further configured to compute combined evacuation time (CET) and reserve capacity at each of the nodes and edges in the residual network of routes; and
an evacuee distributing module (16) configured to compute number of evacuees to be distributed along each of the identified paths, wherein the evacuee distributing module (16) is further configured to compute the number of evacuees such that a relationship $$Ti+xiCi-1=CET,$$

is satisfied, wherein $x_i$ is the number of evacuees along path $P_i$ having transit time $T_i$ and maximum capacity $C_i$.

10. The system of claim 9, further comprising a path optimizer module (18) configured to re-distribute evacuees according to a probabilistic behavioral model.

11. The system of claim 9, wherein the input module (10) is further configured to receive location information pertaining to each of the evacuees from at least one sensor configured to detect location of the evacuees either directly or indirectly.

12. The system of claim 9, wherein the network module (12) is further configured to define the received input parameters in the form of a graph.

13. The system of claim 9, wherein the path identifier module (14) is further configured to compute the CET as a function of maximum capacity (C) the transit time (T) and the number of evacuees (p).

14. The system of claim 9, wherein the evacuee distributing module (16) is further configured to compute the number of evacuees such that a relationship that is based on the number of evacuees $x_i$ along path $P_i$ having $T_i$ transit time and maximum capacity $C_i$ is satisfied.

15. The system of claim 10, wherein the path optimizer module (18) is further configured to compute expected evacuation time satisfies a relationship based on transit time $T_i$ along Path $P_i$, probability that an evacuee follows the shortest path to the nearest sink $(1-\alpha)$, probability that an evacuee follows suggested path $\alpha$, number of evacuees $x_i$ along path $P_i$ and number of identified paths $k$.

16. The system of claim 10, wherein the path optimizer module (18) is further configured to compute expected evacuation time according to a relationship:

$$E[T]=\max(T1+(1-\alpha)\cdot nC1-1, \max_{2\le i\le k}(Ti+\alpha\cdot xiCi-1))$$

wherein, E[T] is expected evacuation time, $T_i$ is transit time along Path $P_i$, $(1-\alpha)$ is the probability that an evacuee follows the shortest path to the nearest sink, $\alpha$ is the probability that an evacuee follows suggested path, $x_i$ is the number of evacuees along path $P_i$ and $k$ is the number of identified paths.

17. The system of claim 9, further comprising one or more of:
a termination module (20) configured to check for at least one termination condition selected from the group consisting of:
(a) there is a sink node reachable from a source node;
(b) the transit time of identified path is less than combined evacuation time (CET); and
(c) there is a path identified for each evacuee; and
an annunciator module (301) configured to provide at least one of audio and video annunciations pertaining to suggested identified path for each evacuee.

* * * * *